US011414761B2

(12) United States Patent
Daubinger et al.

(10) Patent No.: US 11,414,761 B2
(45) Date of Patent: Aug. 16, 2022

(54) COATING SURFACES WITH NANOSTRUCTURES (71) Applicant: Albert-Ludwigs-Universität Freiburg, Freiburg (DE)

(72) Inventors: Patrick Daubinger, Bamberg (DE); Jochen Kieninger, Denzlingen (DE); Gerald Urban, Freiburg (DE)

(73) Assignee: ALBERT-LUDWIGS-UNIVERSITÄT FREIBURG, Freiburg (DE)

( * ) Notice: Subject to any disclaimer, the term of this patent is extended or adjusted under 35 U.S.C. 154(b) by 16 days.

(21) Appl. No.: 15/349,072

(22) Filed: Nov. 11, 2016

(65) Prior Publication Data

US 2017/0081772 A1 Mar. 23, 2017

Related U.S. Application Data (63) Continuation of application No. PCT/EP2015/060354, filed on May 11, 2015.

(51) Int. Cl.
*C25D 5/00* (2006.01)
*C23C 18/16* (2006.01)
(Continued)

(52) U.S. Cl.
CPC ...... *C23C 18/1646* (2013.01); *C23C 18/1653* (2013.01); *C23C 18/44* (2013.01);
(Continued)

(58) Field of Classification Search
None
See application file for complete search history.

(56) References Cited

U.S. PATENT DOCUMENTS 6,346,222 B1* 2/2002 Abys ............... C01G 55/002
106/1.28
7,449,098 B1* 11/2008 Mayer ............... B23H 5/08
205/118
(Continued)

FOREIGN PATENT DOCUMENTS

DE 102004041813 A1 3/2006
DE 102005006014 A1 8/2006
(Continued)

OTHER PUBLICATIONS

Lee et al., "Fabrication and characterization of multilayered nanoporous platinum films deposited by electroplating and nonionic surfactant molds",Applied Surface Sciences, 277, 2013, 100-104. (Year: 2013).*
(Continued)

Primary Examiner — Stefanie S Wittenberg
(74) Attorney, Agent, or Firm — Bejin Bieneman PLC (57) ABSTRACT At least one substrate part for is provided for coating. A first deposition is provided on the at least one support part as microstructuring of at least one first substance selected from the group consisting of rhenium, ruthenium, rhodium, palladium, silver, osmium, iridium, platinum, gold, tin, zinc, copper, cobalt, lead, nickel and alloys comprising these, from at least one first compound which provides the at least one first substance. A second deposition is provided on the at least one support part as a nano-structuring of at least one second substance chosen from a group comprising rhenium, ruthenium, rhodium, palladium, silver, osmium, iridium, platinum, gold and/or alloys thereof, of at least one second compound which provides the at least one second substance, in a solution.

19 Claims, 5 Drawing Sheets (51) Int. Cl.
*C25D 3/52* (2006.01)
*C25D 5/10* (2006.01)
*C23C 18/44* (2006.01)

(52) U.S. Cl.
CPC .............. *C25D 3/52* (2013.01); *C25D 5/10* (2013.01); *C25D 5/605* (2020.08)

(56) References Cited

U.S. PATENT DOCUMENTS

| | | | | |
|---|---|---|---|---|
| 2005/0074663 A1* | 4/2005 | Farneth | ............. | H01M 4/90 429/401 |
| 2009/0243584 A1* | 10/2009 | Zhang | ............. | B81C 1/00031 324/71.1 |
| 2009/0250353 A1* | 10/2009 | Chen | ............. | B01J 23/42 205/210 |
| 2011/0008715 A1* | 1/2011 | Merzougui | ......... | C23C 18/1653 429/524 |
| 2011/0120883 A1* | 5/2011 | Clasquin | ............. | C25F 3/16 205/684 |
| 2014/0087205 A1 | 3/2014 | Pang et al. | | |

FOREIGN PATENT DOCUMENTS

| | | | | |
|---|---|---|---|---|
| DE | 102006004653 A1 | | 8/2007 | |
| EP | 1533397 A2 | | 5/2005 | |
| GB | 1515279 A | | 6/1978 | |
| WO | 2007137412 A1 | | 12/2007 | |
| WO | 2009120204 A1 | | 10/2009 | |
| WO | WO-2013099567 A1 | * | 7/2013 | ........... H01L 51/442 |
| WO | WO2014037380 | * | 3/2014 | ............ C23C 14/14 |

OTHER PUBLICATIONS

Hill et al. "Effect of Pb(ll) on the morphology of platinum electrodeposited on highly oriented pyrolytic graphite", Langmuir, 1999, 15, 4005-4010 (Year: 1999).*

Grujicic et al. "Reaction and nucleation mechanisms of copper electrodeposition from ammoniacal solutions on vitreous carbon" Electrochimica Acta, 50, 2005, 4426-4443 (Year: 2005).*

Chen et al., Temperature and pH dependence of the catalytic activity of colloidal platinum nanoparticles stabilized by poly[(vinylamine)-co-(N-vinylisobutyramide)], Macromol. Chem. Phys. 2000, 201, 18. (Year: 2000).*

Lu et al.,"Electrodeposition of Platinum on Highly Oriented Pyrolytic Graphite. Part I: Electrochemical Characterization", J. Phys. Chem. B, 109, 7998-8007, 2005. (Year: 2005).*

Romankiw, "A path: from electroplating through lithographic masks in electronics to LIGA in MEMS", Electrochimica Acta, 42, 20-22, 2985-3005, 1997 (Year: 1997).*

Gomez et al., "Platinum colloids stabilized by bifunctional ligands: self-organization and connection to gold", Chem Commun, 2001, 1474-1475. (Year: 2001).*

Kijima et al., "Noble-metal nanotubes (Pt, Pd, Ag) from lyotropic mixed-surfactant liquid-crystal templates", Angew, Chem, 2004, 116, 230-234. (Year: 2004).*

T. Biegler, D.A. Rand, and R.J. Woods, Limiting Oxygen Coverage on Platinized Platinum; Relevance to Determination of Real Platinum Area by Hydrogen Adsorption, J. Electroanal. Chem., 1971, 29, pp. 269-277.

J.M. Rodriguez, J. Melian, J.A. Herrera, and J.P. Pena, Determination of the Real Surface Area of Pt Electrodes by Hydrogen Adsorption Using Cyclic Voltammetry, Journal of Chemical Education, Sep. 2000, vol. 77, No. 9, pp. 1195-1197.

International Search Report and Written Opinion for PCT/EP2015/060354 dated Jul. 23, 2015 (16 pages; with English translation).

* cited by examiner

COATING SURFACES WITH NANOSTRUCTURES

CROSS-REFERENCE TO RELATED APPLICATIONS

This application is a national stage of, and claims priority to, Patent Cooperation Treaty Application No. PCT/EP2015/060354, filed on May 11, 2015, which claims priority to German Application No. DE 10 2014 006 739.4 filed on May 12, 2014, each of which applications are hereby incorporated herein by reference in their entireties.

BACKGROUND

For many technical and medical applications, it is necessary to provide components which have a coating having a very large active surface area. This is desirable not only to increase the efficiency in catalysis processes, e.g. in fuel cells or in sensors, but also, for example, in neural stimulation or else in tumor diagnostics and in clinical monitoring.

SUMMARY

The present invention relates to a process for coating surfaces with nanostructures and also a coated component produced by means of this process and its use. The component which has been produced by the process has a coating whose reactivity is improved.

A process for coating surfaces with nanostructures comprises the steps of
- providing at least one support part for coating;
- electrochemically providing a first deposition on the at least one support part as microstructuring of at least one first substance selected from the group consisting of rhenium, ruthenium, rhodium, palladium, silver, osmium, iridium, platinum, gold, tin, zinc, copper, cobalt, lead, nickel and alloys comprising these, from at least one first compound which provides the at least one first substance
- providing a second deposition on the at least one support part as nanostructuring of at least one second substance selected from the group consisting of rhenium, ruthenium, rhodium, palladium, silver, osmium, iridium, platinum, gold and alloys comprising these, from at least one second compound which provides the at least one second substance, in a solution.

The support part itself can comprise an electrically conductive support or a support having an electrically conductive coating. This coating can, e.g., consist of a material selected from the group consisting of platinum, gold, palladium, carbon, copper, nickel, iridium, silver, rhodium, ruthenium, osmium, rhenium, niobium, beryllium, copper, tin and alloys containing the abovementioned elements, also with further elements. Here, platinum, gold, palladium, carbon, iridium and/or osmium are particularly preferably selected, e.g., platinum, palladium and/or gold, in each case also their alloys, also with further elements. The support part can have been coated, particularly when it is not itself conductive, with an electrically conductive coating, e.g., with a coating of this type comprising the abovementioned materials or alloys, e.g., platinum, palladium and/or gold. The support part can have a coating composed of polycrystalline conductive material, e.g., composed of platinum, palladium and/or gold. The support part comprises a support which consists of a material selected from the group consisting of glass, in particular borosilicate glass, metals, polymers, semiconductors and PEM (polymer-electrolyte membrane). As PEM, preference is given to using Nafion (registered trade mark) from DuPont. If the material of the support part is not electrically conductive, the support part comprises at least one electrically conductive coating, in particular composed of a material as mentioned above, in addition to the support.

If the support part is not itself electrically conductive but has an electrically conductive coating, this coating is, e.g., carried out by means of CVD (chemical vapor deposition), e.g., PECVD (plasma enhanced chemical vapor deposition), and/or PVD (physical vapor deposition). In the production of such a coating for a support part which is subjected to the first and second deposition, it is advantageous firstly to deposit a silicon-containing substance, e.g., silicon nitride, on a support for this coating, which then together form the support part. Electrically conductive material comprising one of the abovementioned electrically conductive materials, e.g., platinum, palladium and/or gold, is subsequently deposited on this silicon-containing layer. This can be carried out by firstly depositing a metal layer composed of a nonconductive metal or metal having a poor conductivity, for example titanium, then an electrically conductive layer, for example composed of platinum, and then another layer of metal, for example titanium; the uppermost metal layer here, for example composed of titanium, is subsequently removed in certain regions, for example by an etching process, so that the more electrically conductive layer, for example comprising platinum or consisting of platinum, is exposed.

Before the first and second deposition, the support part, particularly when it is a coated support part as described above, is conditioned, e.g., by electrochemical methods, e.g., by potentiostatic methods, e.g., by cyclic voltammetry, or by current ramping. For this purpose, the component is, e.g., introduced into an ion-containing, in particular salt-containing, aqueous solution and conditioned until stable values are attained. In the case of electrochemical conditioning using cyclic voltammetry or by means of current ramping, the support part is, for example, conditioned until stable, i.e., identically shaped cyclic voltammograms or current ramps are repeatedly obtained.

This support part, optionally comprising a support with a coating as described above, is subjected to the first deposition (microstructuring). The first deposition is carried out by means of at least one first substance selected from the group consisting of rhenium, ruthenium, rhodium, palladium, silver, osmium, iridium, platinum, gold, tin, zinc, copper, cobalt, lead, nickel and alloys comprising these. When the expression "alloys comprising these" is used in the context of the present disclosure, this means alloys of the abovementioned elements not only among these elements but optionally also with other elements of the Periodic Table. It is important that the at least one first substance which is deposited in the microstructuring on the support part is electrically conductive. The at least one first substance does not necessarily have to be catalytically active or have further properties. The at least one first substance serves first and foremost as base structure on which nanostructuring is carried out during the second deposition according to the disclosed process.

The at least one first substance is provided from at least one first compound. This at least one first compound is advantageously selected from the group consisting of hexachloro and tetrachloro compounds, phosphates, sulfates, oxides, nitrates, halogens, carbonyls, acetates, cyanides, complex salts and oxygen and chlorine-containing hydrogen acids. This selection also applies to the at least one second compound which provides the at least one second substance. As examples, mention may be made, from the group of noble metals, of $HReO_4$, $RuCl_3$, $RuBr_3$, $RuI_3$, $K_2Ru(NO)Cl_5$, salts of the anion $[Ru_2N(H_2O)_2Y_8]^{3-}$, salts of the cation $[Ru_2N(NH_3)_8X_2]^{3+}$, $RhCl_3$, $Rh_2(SO_4)_3$, $RhPO_4$, $PdCl_2$, $Pd(NH_3)_4Cl_2$, $AgNO_3$, salts of the anion $Ag_2SO_4$, $[Ag(CN)_2]$, $OsCl_4$, $OsO_x$, $IrCl_3$, $Br_6IRNa_3$, $HAuCl_4$, $HAuBr_4$, $KAu(CN)_2$, $H_2PtCl_6$, $K_2PtCl_6$ and $H_2[Pt(OH)_6]$. If the at least one first compound provides a first substance which does not originate from the group of noble metals, examples of first compounds would be $CuSO_4$, salts of the anion $Cu(P_2O_7)^{2-}$, $NiCl_2$, $NiSO_4$, $Ni(SO_3NH_2)_2$, $ZnCl_2$, salts of the anion $[Zn(CN)_4]^{2-}$, salts of the anion $[Zn(OH)_4]^{2-}$, $SnSO_4$, $SnO_x$, $CoCl_2$ and $CoSO_4$.

If, for example, the first substance is platinum, the then platinum-containing first compound can advantageously be selected from the group consisting of $H_2PtCl_6$ (hexachloroplatinic acid), $K_2PtCl_6$ (potassium hexachloroplatinate) and $K_2PtCl_4$ (potassium tetrachloroplatinate).

Preference is given to using an aqueous solution of the first and/or second compound, in particular of those mentioned above. The concentration of the at least one first substance before commencement of the deposition process in the first deposition step in solution is at least 0.1 g/l (gram per liter), e.g., at least 1 g/l, e.g., at least 3 g/l, and is, e.g., in the range from about 0.1 g/l to about 100 g/l, e.g., in the range from about 3 g/l to about 10 g/l, e.g., in the range from about 4 g/l to about 8 g/l. Based on the at least one first and/or second compound, the concentration is, e.g., in the range from about 0.1 mM (milliMolar) to about 1 M (Molar), e.g., in the range from about 0.2 mM to about 0.8 M, e.g., in the range from about 0.9 mM to about 0.5 M.

Where it is said in the context of the present disclosure that the first and/or second compound provides the at least one first or second substance, this means that the at least one first or second substance, which is generally present as metal or alloy, generally the metals concerned in ionic or salt-like form or these metals are present in covalently bound form in the first and/or second compound.

In the first deposition of at least one first substance from the group consisting of the noble metals rhenium, ruthenium, rhodium, palladium, silver, osmium, iridium, platinum, gold and alloys comprising these, it is advantageous to make additional use of at least one compound containing metal ions, e.g., a lead-containing compound. The substance containing metal ions is, e.g., selected from the group consisting of acetates, sulfides and sulfates of metals of groups IVb, Vb, VIb, IVa and Va of the Periodic Table. The use of the at least one compound containing metal ions advantageously improves the deposition of the at least one first substance. It is assumed here that the metal from the compound containing metal ions, for example lead, may well firstly deposit on the at least one support part and then be replaced by the at least one first substance, for example platinum. The compound containing metal ions e.g., comprises cations selected from the group consisting of $Pb^{2+}$, $Pb^{4+}$, $Co^{2+}$, $Ti^+$, $Zn^{2+}$, $Bi^{3+}$, $Cd^{2+}$, $Ag^+$, $Sn^{2+}$, $Hg^+$, $Se^{4+}$, $Te^{4+}$ and $Sb^{3+}$. If an element or alloy which does not contain a noble metal is deposited in the first deposition, i.e. a first substance comprising tin, zinc, copper, cobalt, lead, nickel and/or alloys comprising these is deposited, the addition of the abovementioned additional compound containing metal ions is not necessary but can optionally be carried out.

The first deposition is carried out by electrochemical methods, i.e., electrochemically. Here, it is again possible to use, for example, cyclic voltammetry or current ramping, but also other direct current and alternating current methods. Advantageous results are achieved using current ramping.

The second deposition (nanostructuring) of the process follows the first deposition, or else the first deposition and the second deposition are carried out simultaneously. Preference is given to the first deposition being carried out initially and the second deposition being carried out subsequently. The at least one second compound used here, e.g., corresponds to the at least one first compound used in the first deposition, as long as this comprises an element from the group of noble metals, i.e., rhenium, ruthenium, rhodium, palladium, silver, osmium, iridium, platinum, gold and alloys comprising these. In the second deposition, only compounds comprising noble metal group elements are used as a second compound and thus ultimately as a second substance. For this reason, an element from a non-noble metal group can have, for example, been deposited on the support part in the first deposition; a second substance selected from the group of noble metals, as mentioned above, is then deposited on top of this in the second deposition to effect nanostructuring. The first substance and the second substance therefore do not have to be identical, but they can be. Preference is given to using identical first and second compounds in the first and second deposition. However, it is also possible to use, for example, hexachloro salts as first compound and tetrachloro salts, for example of platinum, as second compound. The second deposition is advantageously carried out electrochemically or by means of colloid synthesis. As regards the electrochemical methods which can be employed for the second deposition, these can be identical to those envisaged in the first deposition. As regards carrying out the second deposition by colloid synthesis, this can, for example, be carried out by the sol-gel process or the hydrothermal process or by means of colloidal deposition. Preference is given to the process of colloidal deposition. For this purpose, it is advantageous to use at least one reducing agent in addition to the at least one second compound. The at least one reducing agent is advantageously selected from the group consisting of formic acid, borohydride, hydrogen, hydrazine, citric acid and derivatives thereof, ascorbic acid, ethanol, vitamin B2 and potassium bitartrate. Particular preference is given to using formic acid. The solution used in the second deposition is advantageously aqueous. The first deposition is likewise advantageously also carried out in solution, more advantageously in an aqueous solution, i.e. the support part is at least partially, e.g., completely, immersed in this solution.

The concentration of the at least one second substance before commencement of the second deposition in the solution in the second deposition step is at least 0.01 g/l, e.g., at least 0.1 g/l, e.g., at least 0.3 g/l, e.g., at least 0.5 g/l, and is in the range from about 0.01 g/l to about 10 g/l, e.g., in the range from about 0.1 g/l to about 1.5 g/l, e.g., in the range from about 0.2 g/l to about 1 g/l, e.g., in the range from about 0.4 g/l to about 0.8 g/l. Based on the first and/or second compound used, the concentration of this is in the range from about 0.05 mM to about 50 mM. The concentration of the at least one first substance in the first deposition in solution is at least about 10 times as high, e.g., at least about 12 times as high, as that of the at least one second substance in the second deposition, and is, e.g., from about 12 times as high to about 150 times as high.

The concentration of the at least one reducing agent is, e.g., in the range from about 0.05 mM to about 5 M, e.g., in the range from about 0.5 mM to about 3 M, e.g., in the range from 5 mM to 2.5 M. The concentration of the reducing agent in the second deposition is advantageously at least 100 times as high, e.g., at least 200 times as high, as that of the at least one second substance in the second deposition.

The second deposition is advantageously carried out over a period of at least one hour, e.g., over a period of from at least one hour to one month, e.g., over a period of from at least 5 hours to at least 2 weeks. The first deposition is advantageously carried out over a period of from about one minute to about 60 minutes, e.g., over a period of from about 1.5 minutes to about 10 minutes.

This disclosure further provides both a coated component produced by the process described above and a use of the coated component as sensor, in fuel cells, as PEM, as glucose detector, in neural stimulation, in tumor diagnostics, in clinical monitoring and/or in bio fuel cells. However, use in the context of solar cells (DSSC: dye-sensitized solar cells) would also be possible. The process of the invention is, e.g., used in the coating of electrodes, e.g., for fuel cells.

A catalytically active surface of the nanocoated component can be defined by means of the surface roughness Rf, with the surface roughness Rf being measured on the basis of the required charge for a monolayer of absorbed protons (T. Biegler, D. A. Rand, and R. J. Woods, J. Electroanal. Chem., 1971, 29, pp. 269-277). Due to working in aqueous solution, it has to be taken into account, e.g., that the potential reversal point in the cathodic region in cyclic voltammograms or current ramps influences the platinum-hydrogen desorption peaks during determination of the surface roughness Rf, and therefore the platinum-hydrogen absorption peaks are employed for determining the surface roughness factor Rf. Plotting the current density against time in a cyclic voltammogram or in current ramping enables the total charge Q to be determined by integration of the current density over time. The surface roughness factor Rf is then determined by dividing of the total charge Q by the charge density of oxygen on platinum surfaces, which is 210 $\mu C/cM^2$ (J. M. Rodríguez, J. Melián, J. A. Herrera, and J. P. Pena, Journal of Chemical Education, 2000, 77, pp. 1195-1197). The surface roughness factor Rf for the component which has been coated is at least 2000, e.g., at least 3500 and e.g., at least 4000, and is, e.g., in the range from about 2000 to about 15 000, e.g., in the range from about 3500 to about 10 000.

The component which has been coated has, owing to the first deposition directly adjacent to the surface thereof, which can also be provided by a surface of a coating layer on the component, microstructuring which can be substantially in the form of spherical or hemispherical or cylindrical structures. The nanostructuring occurring in the second deposition can be such that wire-, rod- or tube-shaped nanostructures, which can also be regarded as tree- or leaf-like when viewed in two dimensions, become attached to the structures formed in the first deposition.

SUMMARY OF THE DRAWINGS

Examples will be illustrated by the following figures and examples. The figures show.

DETAILED DESCRIPTION

The features indicated in the examples and in the figures are ones which relate to the specific illustrative embodiments, but can equally well be combined with all features described individually or together in the general description.

Figure 1:
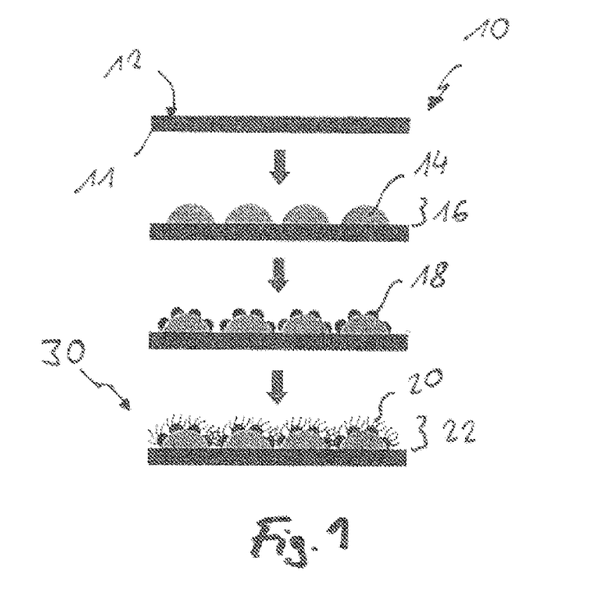
FIG. 1: a schematic process sequence of an example process.

FIG. 1 shows a schematic depiction of an example process. A support part denoted by the reference numeral 10, which comprises a support and a coating (not shown in detail) deposited thereon, is coated with a platinum-containing substance in a first deposition step. Coating is here carried out electrochemically in a two-electrode setup by ramping or direct current techniques. This results in formation of hemispherical deposits 14 in the form of a first coating 16 on a conductive surface 12 of the support part 10. In a second step, further platinum-containing material is deposited by colloid synthesis, with cubic or spherical deposits 18 of platinum firstly forming on the hemispheres 14 and, as the colloid synthesis progresses, nanotubes or nanowires 20 depositing on these deposits 18 to form a three-dimensional surface coating and result in a coated component 30.

Figure 2A:
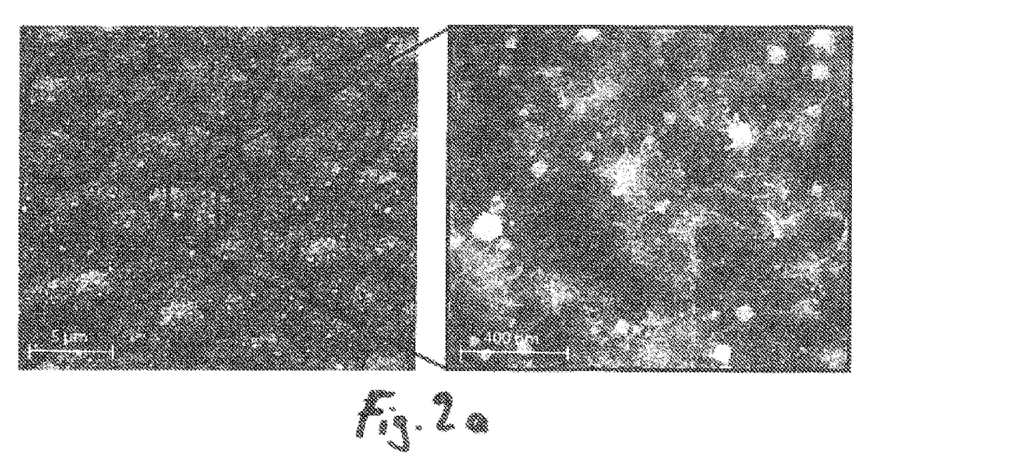
FIG. 2A: scanning electron micrographs of the surface of a coated component.
Figure 2B:
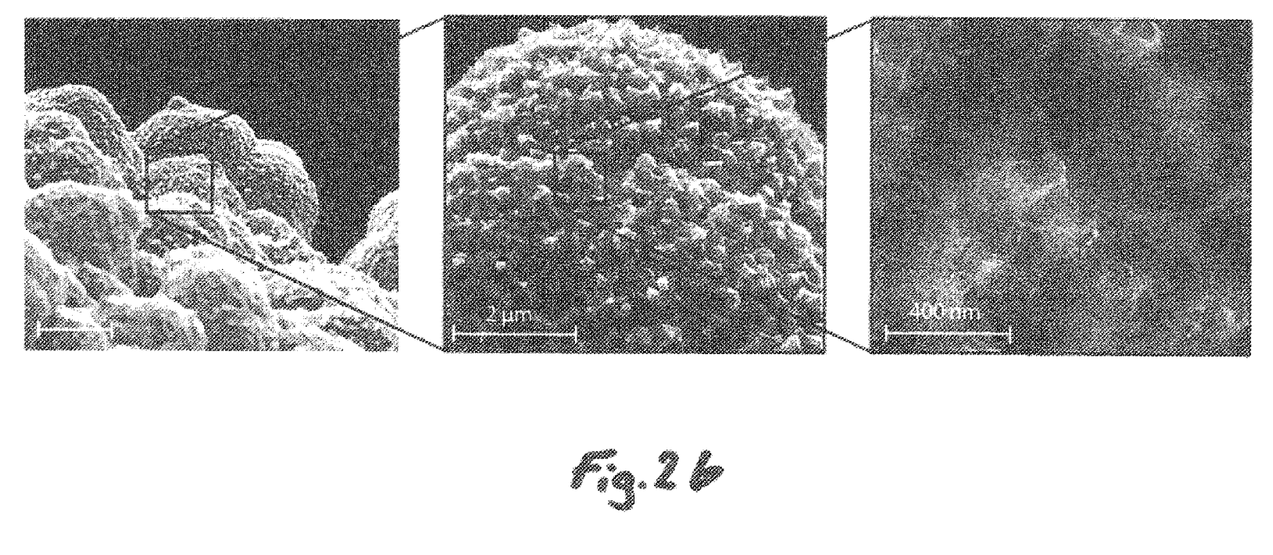
FIG. 2B: scanning electron micrographs of the surface of a further coated component.

FIGS. 2A and 2B show scanning electron micrographs of the coating of two components as per FIG. 1 which have been coated according to the scheme in FIG. 1 in different resolutions. The hemispherical base structures 14 and also the nanotubes or nanowires 20 as schematically shown in FIG. 1 can clearly be seen here.

The coated component 30 as per FIG. 2A was produced as follows: firstly, an uncoated support part 10 was produced by providing a support 11 with an electrically conductive coating on its surface 12. Borosilicate glass wafers having a length of 100 mm and a thickness of 500 m (PYREX BOROFLOAT, SCHOTT AG, Germany) and having a polycrystalline platinum layer were produced here as support 11 in a thin film process. For this, a layer of 200 nm of silicon nitride was firstly deposited on said wafer by PECVD and a 20 nm thick layer of titanium was subsequently deposited on this, a 100 nm thick layer of platinum was deposited thereon and a 50 nm thick layer of titanium was subsequently deposited thereon by PVD. The upper titanium layer was subsequently removed in the desired subregions by an etching process (RIE: reactive ion etching) in order to obtain an exposed, electrically conductive platinum layer. The coated component 10 here can, for example, be configured in the form of an electrode. However, it can also have any other suitable and desired form, depending on the later use of the coated component 30.

The electrically conductive support parts 10 produced in this way were subsequently conditioned by supplying current to the support part 10 by means of cyclic voltammetry in aqueous sulfuric acid solution until stable, i.e., not overlapping, more or less identical cyclic voltammograms were obtained.

The first deposition was subsequently carried out by electrochemically depositing platinum as first substance in hemispherical form on the polycrystalline platinum surface 12 of the support part 10 using current ramps. For this purpose, a solution of 0.14 M $H_2PtCl_6$ (ChemPur Feinchemikalien, Germany) was produced as first compound and 0.066 mM lead acetate trihydrate (Sigma-Aldrich, Germany) was produced as compound containing metal ions. A platinum wire having a diameter of, for example, 290 µm was used as counterelectrode. The counterelectrode and the component 10 as electrode were subsequently connected to a current source and current ramps were run from an initial current density of from 1 to 4 $mA/cm^2$ to a final current density of from −10 to −40 $mA/cm^2$ over from 180 s to 720 s, a current ramp, e.g., being run in the range from 400 s to 720 s in order to obtain very high surface roughness values. When the final current density was reached, this was maintained for 30 seconds. A coating 16 having hemispheres 16, as can be seen in FIG. 1, was formed by means of this electrochemical deposition.

The second deposition was subsequently carried out by colloidal deposition (colloid synthesis). For this purpose, the support part 10 provided with the coating 16 was introduced into an aqueous solution of 2.9 mM $H_2PtCl_6$ (ChemPur Feinchemikalien, Germany) as second compound and 1.24 M formic acid (Merck, Germany). At the beginning of the colloidal deposition, the platinum concentration was still very high (0.6 g/l of platinum), but it decreased during the course of the synthesis. Mainly cubic or spherical structures 18 composed of platinum as second substance were thus formed on the hemispheres 14 (see FIG. 1) in the first 30 hours; nanotubes or nanowires 20 were subsequently formed in the time period from 30 hours to 72 hours; these nanotubes or nanowires 20 then formed, together with the hemispheres 14 and the cubic or spherical structures 18, a coating 22, so as to give the component 30.

The coated component depicted in FIG. 2B, which shows a scanning electron micrograph of same, was produced in a manner identical to that for component 30 shown in FIG. 2A, with the sole difference that a platinum wire having a diameter of 290 µm was used as support 11 instead of a borosilicate glass wafer as support 11 with a coating, as described above. The left-hand picture of FIG. 2B shows spherical deposits 18 of platinum on hemispheres 14, and it can be seen even in the middle picture and very clearly in the right-hand picture of FIG. 2B that these have further nanostructuring in the form of nanowires 20.

Figure 3:
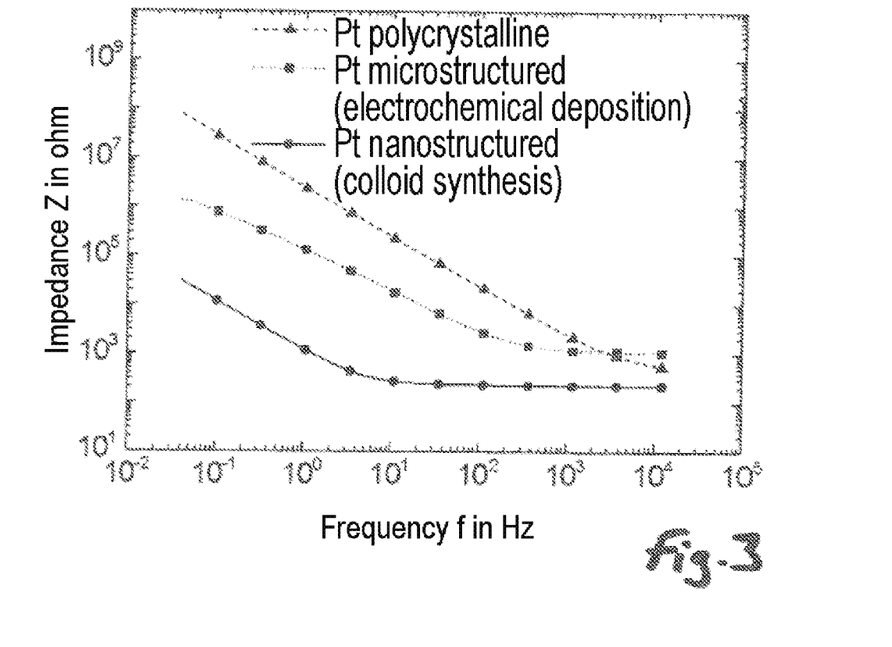
FIG. 3: graphical depiction of the impedance for neural stimulation.

FIG. 3 shows an example use of the coated component 30 for neural stimulation. Here, the impedance is plotted against the frequency and, in addition to that for component 30 according to the invention, the impedance curves of the support part 10 with only a polycrystalline platinum coating and of the support part 10 with the coating 16 were compared. It can clearly be seen that in the case of the component 30 (denoted by Pt NW), a very low impedance of about $5 \times 10^2 \Omega$ could be achieved even at a frequency of about 10 Hz, while in the case of the support part 10 with the polycrystalline coating (denoted by Pt polycrystalline) the impedance was about $4 \times 10^5 \Omega$ at 10 Hz and in the case of the support part 10 with the coating 16 (component 30) (denoted by Pt Black) it was about $3 \times 10^3 \Omega$. Curve fitting using ZPE (constant phase element) in FIGS. 3 and 4 represents modeling of the electrode-electrolyte interface.

In the same experiment, the phase angle was also determined. FIG. 4 shows a plot of the phase angle against the frequency. The component 30 (again denoted by Pt NW) displayed a phase angle close to −90° here up to frequencies of 100 Hz, and in the case of a support part 10 coated with a polycrystalline platinum layer this was close to 0° at 100 Hz and in the case of the support part 10 with a coating 16 (component 30) was about −30°.

Figure 4:
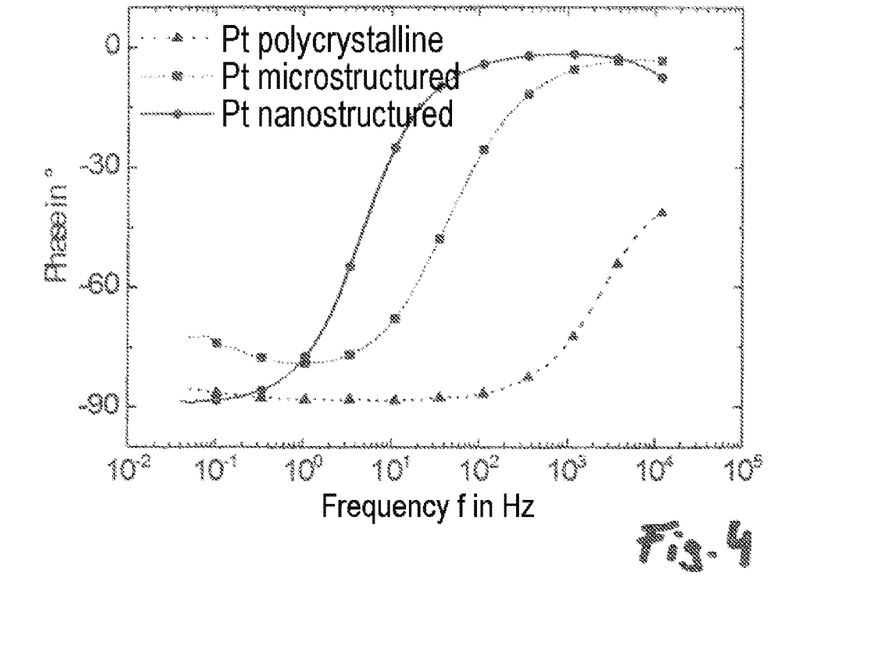
FIG. 4: graphical depiction of the phase angle for neural stimulation.

FIGS. 3 and 4 thus show a considerable decrease in impedance in the case of the component 30 compared to other coated components, which ultimately leads to a reduction in tissue damage and greater sensitivity in neural stimulation. E.g., no signs of cytotoxicity were observed.

Figure 5:
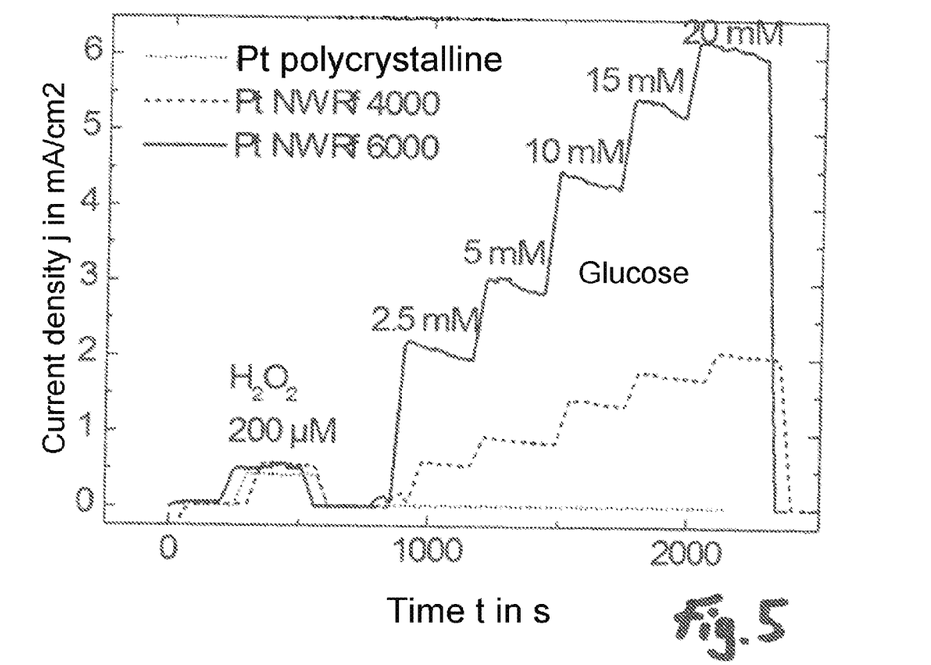
FIG. 5: graph of the current density versus time in glucose oxidation.
Figure 6:
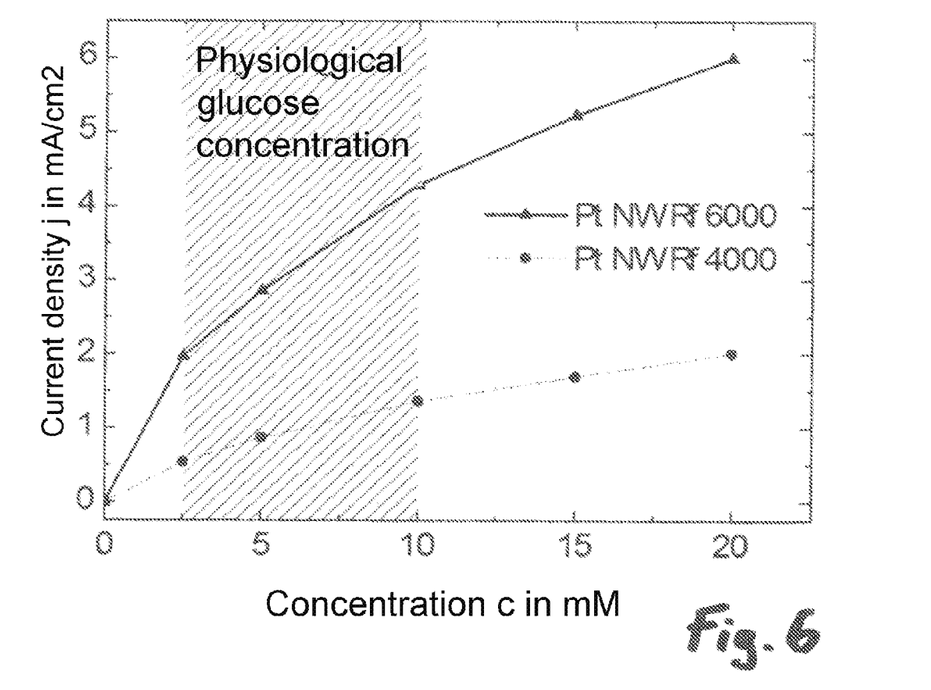
FIG. 6: graph of the current density versus concentration in glucose oxidation.

FIGS. 5 and 6 show the use of the component 30 as glucose sensor or as biological fuel cell. FIG. 5 shows a comparison of hydrogen peroxide oxidation and glucose oxidation at a potential of 1.1 V relative to the RHE, where once again firstly only the support part 10 having a polycrystalline platinum coating and, secondly, the component 30 having two surface roughness values, namely one of Rf=4000 and one of Rf=6000, were used. It can clearly be seen that the current density in the oxidation of hydrogen peroxide remained more or less uninfluenced in the case of all three parts, while considerably higher current densities in the glucose oxidation were observed when using the components according to the invention. Here, the current densities for the component 30 with Rf=6000 were from about 2.5 times to 3 times as high as those of the component 30 with Rf=4000.

FIG. 6 shows a plot of the current density against the concentration of glucose in a biological fuel cell, this time in respect of the component 30 with Rf=4000 and Rf=6000, identical to that used in FIG. 5. It can clearly be seen that the component with Rf=6000 displays considerably higher current densities, increased by a factor of about 3, compared to the component with Rf=4000 in the physiologically interesting concentration range for glucose of from about 2 to 10 mM. FIGS. 5 and 6 show that long-term monitoring of the glucose content is also possible by means of the component 30 without use of any biological components. The component 30 can likewise be used for determining the glucose content in the presence of ascorbic acid and/or uric acid, for example in blood.

Figure 7:
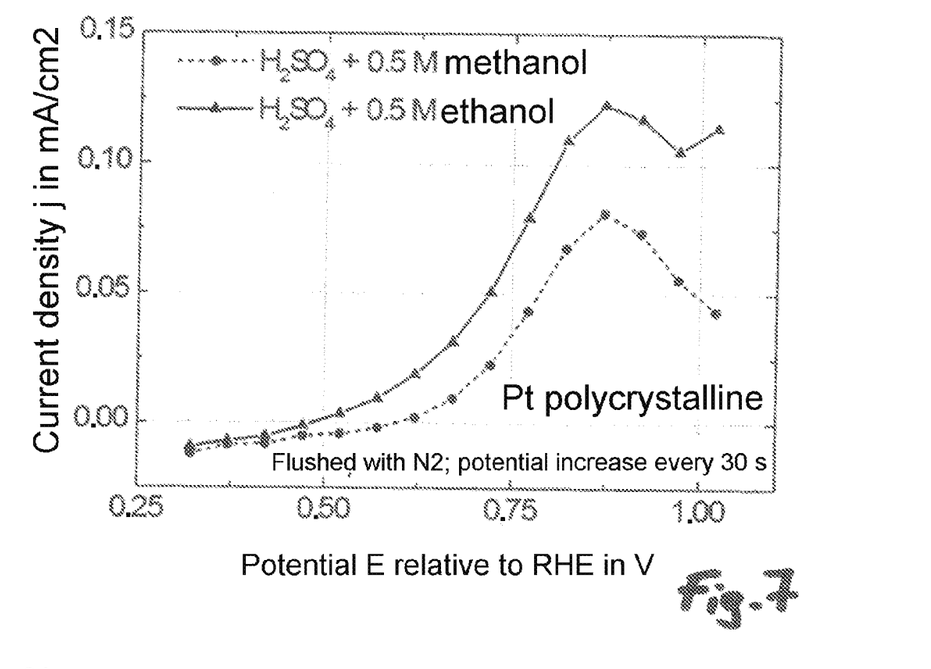
FIG. 7: plot of the current density versus the potential E relative to RHE for methanol and ethanol oxidation using a borosilicate glass which has been coated with polycrystalline platinum.
Figure 8:
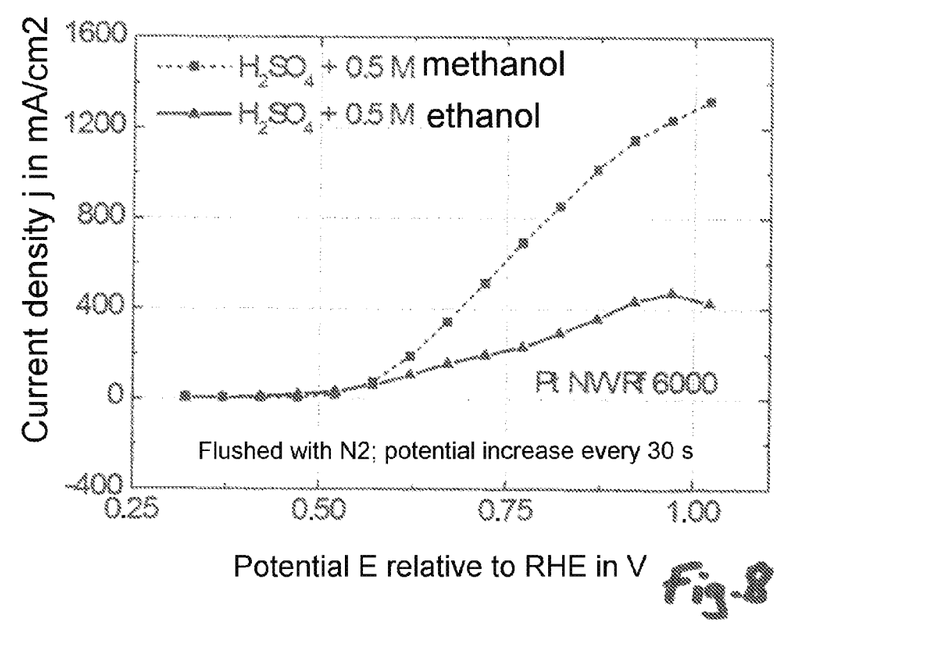
FIG. 8: plot of the current density versus the potential E relative to RHE for methanol and ethanol oxidation for a component which has been coated with platinum and has Rf=6000.

Finally, FIG. 7 and FIG. 8 show a plot of the current density against the potential for methanol and ethanol oxidation at room temperature using a component 30 with Rf=6000 (FIG. 8) and with polycrystalline platinum (FIG. 7) as comparison. There is a clear increase in the current density at a potential of about 0.5 V and the current density reaches a maximum close to a potential of 1 V; at 1 V it is about 23 000 times as high for methanol and about 3500 times as high (for ethanol) as per FIG. 8 than in the case of polycrystalline platinum as per FIG. 7.

The present disclosure provides both a process and a coated component by means of which it is possible to provide highly reactive surface coatings which have a large surface area and lead to an increase in measurable current densities or other parameters in economically feasible fields of use of the coated component. This component can be used in many fields of application which require catalytic reactions, for example in solar cells or in enzymatic biosensors.

The invention claimed is:

1. A process for coating a surface with nanostructures, comprising:
   providing at least one support part to be coated;
   providing a first deposition on the at least one support part of at least one first substance selected from the group consisting of rhenium, ruthenium, rhodium, palladium, silver, osmium, iridium, platinum, gold, and alloys comprising these, from at least one first compound which provides the at least one first substance, while using in addition a third compound in a same solution as the first compound, the third compound containing metal ions selected from the group consisting of acetates, sulfides, and sulfates of metals of groups IVb, Vb, VIb, IVa, and Va of the Periodic Table, wherein the first deposition is carried out by electrochemical methods, wherein the first deposition includes microstructuring;

before the first deposition and a second deposition, conditioning the support part by electrochemical methods selected from a group including potentiostatic methods, cyclic voltammetry, and current ramping, in a salt-containing, aqueous solution; and after the first deposition, providing the second deposition of at least one second substance selected from the group consisting of rhenium, ruthenium, rhodium, palladium, silver, osmium, iridium, platinum, gold, and alloys comprising these, from at least one second compound which provides the at least one second substance, in a solution, wherein the second deposition is carried out by colloid synthesis, wherein the second deposition includes nanostructuring;

wherein the support part after the second deposition includes a plurality of hemispherical deposits and a plurality of nanotubes on the hemispherical deposits; and a concentration of the at least one first substance in the first deposition is at least 10 times as high as that of the at least one second substance in the second deposition.

2. The process as claimed in claim 1, wherein at least one reducing agent is used for the second deposition.

3. The process as claimed in claim 2, wherein at least one of formic acids, borohydride, hydrazine, hydrogen, citric acid and derivatives thereof, ascorbic acid, ethanol, vitamin B2 and potassium bitartrate are used as the reducing agent.

4. The process as claimed in claim 1, wherein an aqueous solution is used for the second deposition.

5. The process as claimed in claim 1, wherein the concentration of the at least one second substance in the solution in the second deposition is at least 0.01 gram per liter.

6. The process as claimed in claim 2, wherein the concentration of the at least one reducing agent in the second deposition is in a range from about 0.05 milliMolar to about 5 Molar.

7. The process as claimed in claim 1, wherein the concentration of the at least one first substance in the first deposition is at least 0.1 gram per liter.

8. The process as claimed in claim 1, wherein at least one of the at least one first compound and the at least one second compound is selected from the group consisting of hexachloro or tetrachloro compounds, phosphates, sulfates, oxides, nitrates, halogens, carbonyls, acetates, cyanides, complex salts and oxygen- and chlorine-containing hydrogen acids of the at least one first substance and second substance.

9. The process as claimed in claim 1, wherein the second deposition is carried out over a period of at least one hour.

10. The process as claimed in claim 1, wherein the first deposition is carried out in a period of from about one minute to about 60 minutes.

11. The process as claimed in claim 1, wherein the support part is provided with at least one third substance in the polycrystalline state before the first deposition.

12. The process as claimed in claim 1, wherein the support part consists of a material selected from the group consisting of glass, metals, semiconductors, polymers and PEM.

13. The process as claimed in claim 1, wherein conditioning the support part by electrochemical methods occurs until identically shaped cyclic voltammograms or current ramps are repeatedly attained.

14. The process as claimed in claim 1, wherein the at least one support part before the first deposition is nonconductive and has an electrically conductive coating.

15. The process as claimed in claim 1, further comprising, before the first deposition, applying a nonconductive coating to the at least one support part, and then removing the nonconductive coating in subregions of the at least one support part, wherein a surface of the at least one support part exposed by removing the nonconductive coating is electrically conductive.

16. The process as claimed in claim 15, wherein removing the nonconductive coating is performed by etching.

17. The process as claimed in claim 1, further comprising, during the second deposition, providing at least one reducing agent, wherein a concentration of the at least one reducing agent is at least 100 times as high as a concentration of the at least one second substance.

18. The process as claimed in claim 1, wherein the first substance is platinum, and the second substance is platinum.

19. The process as claimed in claim 1, wherein the support part between the first deposition and the second deposition includes the hemispherical deposits and lacks the nanotubes.

* * * * *

UNITED STATES PATENT AND TRADEMARK OFFICE
CERTIFICATE OF CORRECTION

| | |
|---|---|
| PATENT NO. | : 11,414,761 B2 |
| APPLICATION NO. | : 15/349072 |
| DATED | : August 16, 2022 |
| INVENTOR(S) | : Patrick Daubinger, Jochen Kieninger and Gerald Urban |

It is certified that error appears in the above-identified patent and that said Letters Patent is hereby corrected as shown below:

On the Title Page

In the Abstract:
Item (57), in Line 1, replace "substrate part for is provided" with -- substrate part is provided --.

Signed and Sealed this
Twenty-second Day of November, 2022

Katherine Kelly Vidal
*Director of the United States Patent and Trademark Office*